US012454943B2

(12) United States Patent
Mathiasen et al.

(10) Patent No.: US 12,454,943 B2
(45) Date of Patent: Oct. 28, 2025

(54) ACTIVE CLAMPING SYSTEM FOR ROAD TRANSPORTATION OF A WIND TURBINE BLADE AND RELATED METHOD

(71) Applicant: Vestas Wind Systems A/S, Aarhus (DK)

(72) Inventors: Dan Mølgaard Mathiasen, Aarhus (DK); Joris Kofman, Aarhus (DK); Kurt Jensen, Aarhus (DK); Maria Victoria Cano Pedrosa, Aarhus (DK); Denys Kotushenko, Aarhus (DK)

(73) Assignee: Vestas Wind Systems A/S, Aarhus (DK)

( * ) Notice: Subject to any disclaimer, the term of this patent is extended or adjusted under 35 U.S.C. 154(b) by 945 days.

(21) Appl. No.: 17/601,472

(22) PCT Filed: Apr. 6, 2020

(86) PCT No.: PCT/DK2020/050094
§ 371 (c)(1),
(2) Date: Oct. 5, 2021

(87) PCT Pub. No.: WO2020/207548
PCT Pub. Date: Oct. 15, 2020

(65) Prior Publication Data
US 2022/0154698 A1     May 19, 2022

(30) Foreign Application Priority Data

Apr. 8, 2019   (EP) ..................................... 19167997

(51) Int. Cl.
*B60P 7/08*   (2006.01)
*B60P 3/40*   (2006.01)
*B60P 7/135*  (2006.01)
*F03D 13/40*  (2016.01)

(52) U.S. Cl.
CPC ................ *F03D 13/40* (2016.05); *B60P 3/40* (2013.01); *B60P 7/135* (2013.01); *F05B 2260/02* (2013.01)

(58) Field of Classification Search
CPC .... B60P 3/40; B60P 7/12; B60P 7/135; F03D 13/40

(Continued)

(56) References Cited

U.S. PATENT DOCUMENTS 5,496,146 A * 3/1996 Thomas .................. B60P 3/035
                                                414/910
7,775,753 B2 * 8/2010 Pedersen ................... B60P 3/40
                                                410/44

(Continued)

FOREIGN PATENT DOCUMENTS

CN    102037237 A    4/2011
CN    206254373 U    6/2017

(Continued)

OTHER PUBLICATIONS

European Patent Office, International Search Report and Written Opinion in PCT Application No. PCT/DK2020/050094, Jul. 8, 2020.

(Continued)

*Primary Examiner* — Stephen T Gordon
(74) *Attorney, Agent, or Firm* — Wood Herron & Evans LLP (57) ABSTRACT

A transportation arrangement (10) includes a dolly and a clamp (20) secured to the dolly (14). The clamp (20) includes a frame (30) having a lower portion (32) coupled to the dolly (14) and an upper portion (34) selectively rotatable relative to the lower portion (32), a saddle (100) positioned on the lower portion of the frame, a jaw (130) movably positioned on the upper portion (34) of the frame (30), and (Continued)

an actuator (150) operatively coupled to the jaw (130) and configured to move the jaw (130) relative to the saddle (100) to apply a clamping force on a blade (16). The actuator (150) is configured to extend the jaw (130) toward the saddle (100) in response to the clamping force being less than or equal to a minimum threshold clamping force, and may be configured to retract the jaw (130) away from the saddle (100) in response to the clamping force being greater than or equal to a maximum threshold clamping force. A method of transporting a blade (16) is also disclosed.

19 Claims, 9 Drawing Sheets

(58) Field of Classification Search
USPC ..... 410/32, 34, 36, 42, 44, 45, 53, 120, 155
See application file for complete search history.

(56) References Cited

U.S. PATENT DOCUMENTS

| | | | |
|---|---|---|---|
| 2011/0031292 A1 | 2/2011 | Krogh et al. | |
| 2015/0037112 A1* | 2/2015 | Nagabhushana | B60P 3/40 410/44 |
| 2015/0337799 A1 | 11/2015 | Hansen et al. | |
| 2016/0017861 A1 | 1/2016 | Sigurdsson | |
| 2016/0201644 A1 | 7/2016 | Thomsen | |
| 2019/0032639 A1 | 1/2019 | Thomsen et al. | |

FOREIGN PATENT DOCUMENTS

| | | |
|---|---|---|
| CN | 108700037 A | 10/2018 |
| EP | 2584191 A1 | 4/2013 |
| EP | 2669508 A1 | 12/2013 |
| EP | 2947311 A1 | 11/2015 |
| FR | 2011719 A1 | 3/1970 |
| JP | 2010216317 A | 9/2010 |
| JP | 2011160406 A | 8/2011 |
| WO | 2017114533 A1 | 7/2017 |

OTHER PUBLICATIONS

European Patent Office, Extended Search Report in EP Application No. 19167997.6, Oct. 22, 2019.
China National Intellectual Property Administration, office action issued in corresponding Chinese Application No. 202080040299.7, mailed Apr. 17, 2023, with translation.

* cited by examiner

ACTIVE CLAMPING SYSTEM FOR ROAD TRANSPORTATION OF A WIND TURBINE BLADE AND RELATED METHOD

TECHNICAL FIELD

This invention generally relates to wind turbines, and more particularly to an active clamping system for transporting a wind turbine blade.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades extending from a hub and supported in the nacelle by means of a shaft. The shaft couples the rotor either directly or indirectly with a generator, which is housed inside the nacelle. Consequently, as wind forces the blades to rotate, electrical energy is produced by the generator.

Transportation of wind turbine blades from their production site to their installation location or to an interim storage site poses a variety of technical challenges, particularly in view of the ever-increasing size of individual blades. Previously, a very long trailer such as an oversized or extendable truck bed was commonly used for transporting blades. More recently, the use of dollies has become preferable as the length of blades has increased, because such dollies allow for improved maneuvering around curves, junctions, or other potential road or roadside obstacles.

In many cases, a dolly may be towed from a truck by a cable or boom. However, a dolly's ability to navigate around obstacles may be improved if the dolly were not towed from the truck by such a cable or boom. Therefore, it is desirable for the dolly to simply be towed from the truck by the blade itself. In some cases, a dolly may additionally be equipped with a dedicated drive arrangement. However, such a dedicated drive arrangement necessarily increases the complexity and cost of the dolly, and may therefore preferably be omitted.

To that end, a blade may be operatively coupled to the dolly via a clamp positioned around a tip end region of the blade. The clamp may frictionally engage the blade to restrain the blade on the dolly. In this manner, the connection between the blade and the clamp may define the load path between the truck and the dolly for allowing the truck to tow the dolly without any towing cables or booms extending therebetween. Thus, acceleration of the truck may be transmitted to the dolly via the blade and the clamp. Likewise, braking action of the truck may be transmitted to the dolly via the blade and the clamp. In some cases, the dolly may be equipped with a dedicated braking arrangement, such that the braking action of the truck may only momentarily be transmitted to the dolly via the blade and the clamp before the dedicated braking arrangement of the dolly is activated.

Towing the dolly by the blade presents various potential problems which may arise as a result of the acceleration and deceleration forces transmitted along the blade and the clamp to the dolly during transportation tending to undermine the connection between the blade and the clamp. In particular, the frictional engagement of the clamp with the blade may be undermined during transportation if the blade drifts or creeps forward relative to the clamp, which could ultimately result in the blade slipping free from the clamp. On the other hand, the clamp may be applied excessively tightly around the blade in an effort to prevent such slippage, which may inadvertently cause the clamp to compressively damage the blade thereby compromising the structural integrity of the blade and rendering the blade unusable. Moreover, the interface between the blade and the clamp may be subjected to vibrations and shocks during transportation which may cause unexpected increases and/or decreases in the clamping force applied to the blade. Current clamping systems do not provide any means to account for these undesirable changes in the applied clamping force.

Manufacturers of wind turbines and wind turbine components continually strive to improve systems and methods associated with the transportation and handling of wind turbine blades. It would therefore be desirable to provide an improved clamping system for transporting a wind turbine blade that ensures a sufficiently firm clamping action on the blade to restrain the blade during transportation, while at the same time preventing excessive, possibly damaging force from being applied to the blade.

SUMMARY

In one embodiment, a transportation arrangement includes a dolly and a clamp secured to the dolly. The clamp includes a frame having a lower portion coupled to the dolly and an upper portion selectively rotatable relative to the lower portion, at least one saddle positioned on the lower portion of the frame, at least one jaw movably positioned on the upper portion of the frame, and at least one jaw actuator operatively coupled to the at least one jaw and configured to move the at least one jaw relative to the at least one saddle to apply a clamping force on a blade positioned between the at least one saddle and the at least one jaw. The at least one jaw actuator is configured to extend the at least one jaw toward the at least one saddle in response to the clamping force being less than or equal to a predetermined minimum threshold clamping force. The at least one jaw actuator may also be configured to retract the at least one jaw away from the at least one saddle in response to the clamping force being greater than or equal to a predetermined maximum threshold clamping force.

In one embodiment, the clamp further includes at least one energy storage device configured to selectively store and release energy from and to the at least one jaw actuator. For example, the at least one energy storage device may be configured to release energy to the at least one jaw actuator in response to the clamping force being less than or equal to the predetermined minimum threshold clamping force. In addition or alternatively, the at least one energy storage device may be configured to store energy from the at least one jaw actuator in response to the clamping force being greater than or equal to the predetermined maximum threshold clamping force.

The at least one energy storage device may include at least one hydraulic accumulator. In this regard, the at least one jaw actuator may include at least one hydraulic cylinder including a barrel defining an interior, a piston configured to reciprocate within the barrel and dividing the interior of the barrel into a bottom chamber and a piston rod side chamber, and a piston rod including a first end operatively coupled to the piston within the piston rod side chamber and a second end operatively coupled to the at least one jaw, wherein the bottom chamber is fluidly coupled to the at least one hydraulic accumulator. In one embodiment, the at least one hydraulic accumulator is configured to supply hydraulic fluid to the bottom chamber in response to a hydraulic fluid pressure within the bottom chamber being less than or equal to a first predetermined minimum threshold pressure corresponding to the predetermined minimum threshold clamping force to extend the at least one jaw toward the at least one saddle. In addition or alternatively, the at least one hydraulic accumulator may be configured to receive hydraulic fluid from the bottom chamber in response to the hydraulic fluid pressure within the bottom chamber being greater than or equal to a predetermined maximum threshold pressure corresponding to the predetermined maximum threshold clamping force to retract the at least one jaw from the at least one saddle. The transportation arrangement may further include a display and at least one pressure sensor configured to detect a hydraulic fluid pressure within the bottom chamber, wherein the at least one pressure sensor is configured to communicate an alert to the display in response to the detected hydraulic fluid pressure being less than or equal to a second predetermined minimum threshold pressure less than the first predetermined minimum threshold pressure. In another embodiment, the at least one energy storage device includes at least one spring.

In one embodiment, the transportation arrangement further includes a truck configured to tow the dolly, and a blade including a first region operatively coupled to the truck and a second region positioned between the at least one saddle and the at least one jaw of the clamp such that the second region is operatively coupled to the dolly via the clamp. The blade and the clamp define a load path between the truck and the dolly for allowing the truck to tow the dolly. The first region of the blade may include a root end region of the blade and the second region of the blade may include a tip end region of the blade.

The at least one saddle and the at least one jaw may each include at least one friction pad. In addition or alternatively, the clamp may further include an open/close actuator operatively coupled to the upper portion of the frame and configured to selectively rotate the upper portion relative to the lower portion. A transport arrangement according to the invention, and preferred optional features, are defined in the appended claims.

In another embodiment, a method of transporting a wind turbine blade is provided. The method includes providing a dolly and a clamp secured to the dolly, rotating a first portion of the clamp relative to a second portion of the clamp to an opened position, inserting a region of the blade into the clamp, rotating the first portion of the clamp relative to the second portion of the clamp to a closed position, and moving at least one jaw into frictional engagement with the blade to apply a clamping force on the blade. The method also includes extending the at least one jaw toward the second portion of the clamp in response to the clamping force being less than or equal to a predetermined minimum threshold clamping force. The method may also include retracting the at least one jaw away from the second portion of the clamp in response to the clamping force being greater than or equal to a predetermined maximum threshold clamping force. In one embodiment, extending the at least one jaw includes selectively releasing energy from at least one energy storage device to the at least one jaw actuator in response to the clamping force being less than or equal to the predetermined minimum threshold clamping force. In addition or alternatively, retracting the at least one jaw may include selectively storing energy from the at least one jaw actuator in at least one energy storage device in response to the clamping force being greater than or equal to the predetermined maximum threshold clamping force. Hence, retracting the at least one jaw may include allowing the jaw to be pushed back by the action of the blade in the clamp.

The method may further include towing the dolly from a truck via the blade and the clamp such that the blade and the clamp define a load path between the truck and the dolly. The method may also include rotating the first portion of the clamp relative to the second portion of the clamp to an opened position after towing the dolly from the truck via the blade and the clamp, and removing the region of the blade from the clamp. A method according to the invention, and preferred optional features, are defined in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
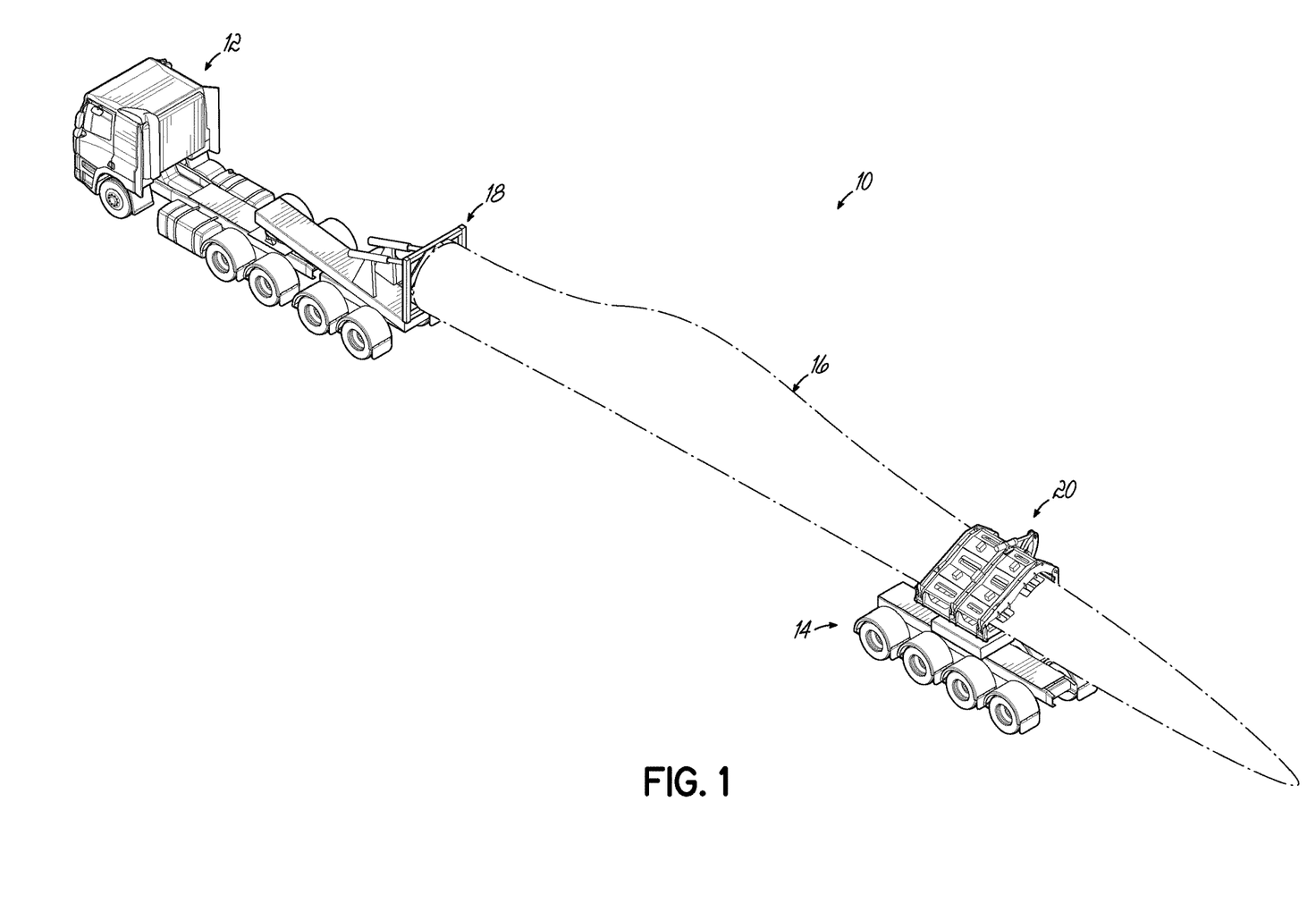
FIG. 1 is a perspective view of an exemplary transportation arrangement including a truck, a dolly, a wind turbine blade, and a clamp in accordance with an aspect of the invention.
Figure 2:
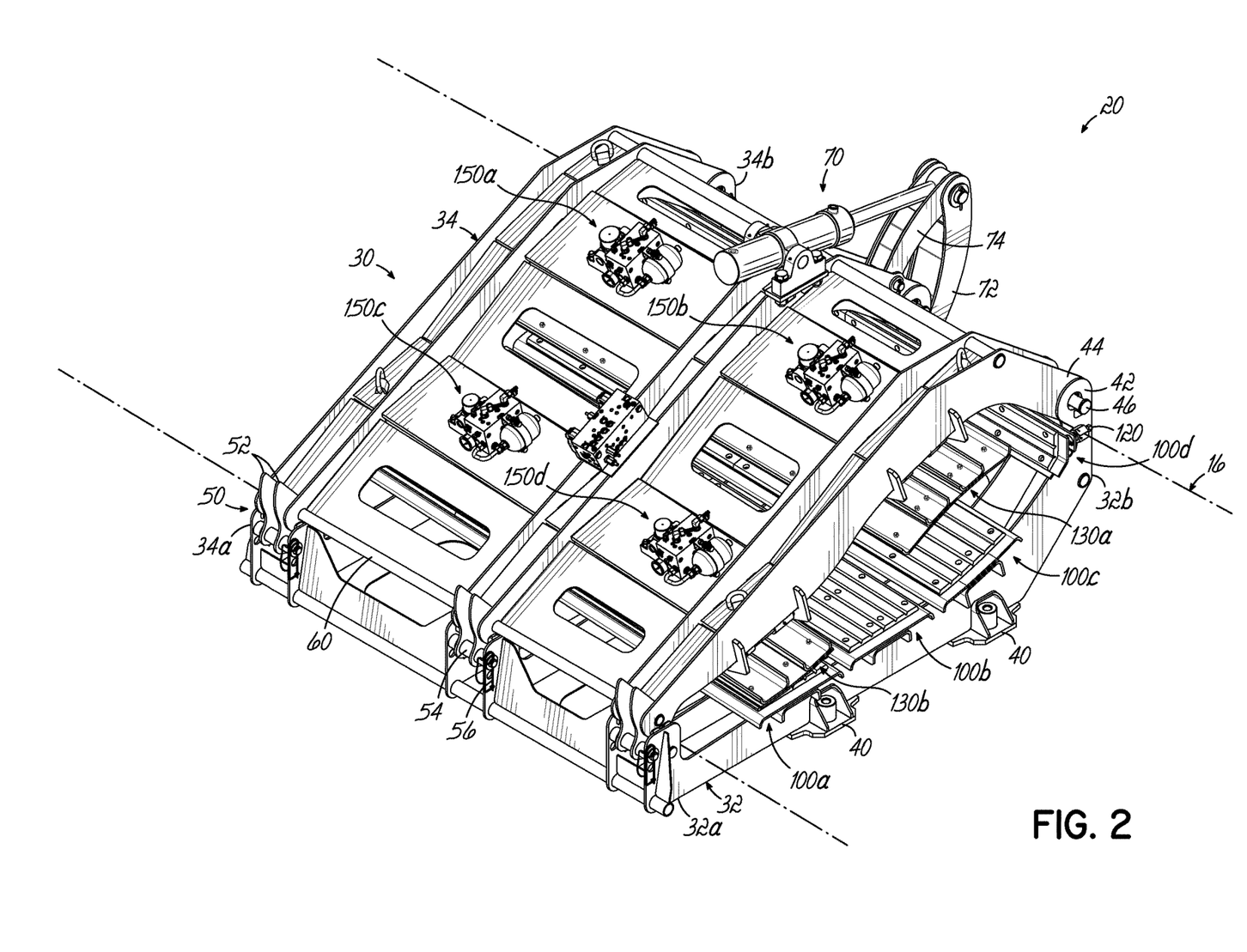
FIG. 2 is a front perspective view of the clamp shown in FIG. 1, showing the blade in phantom.
Figure 3:
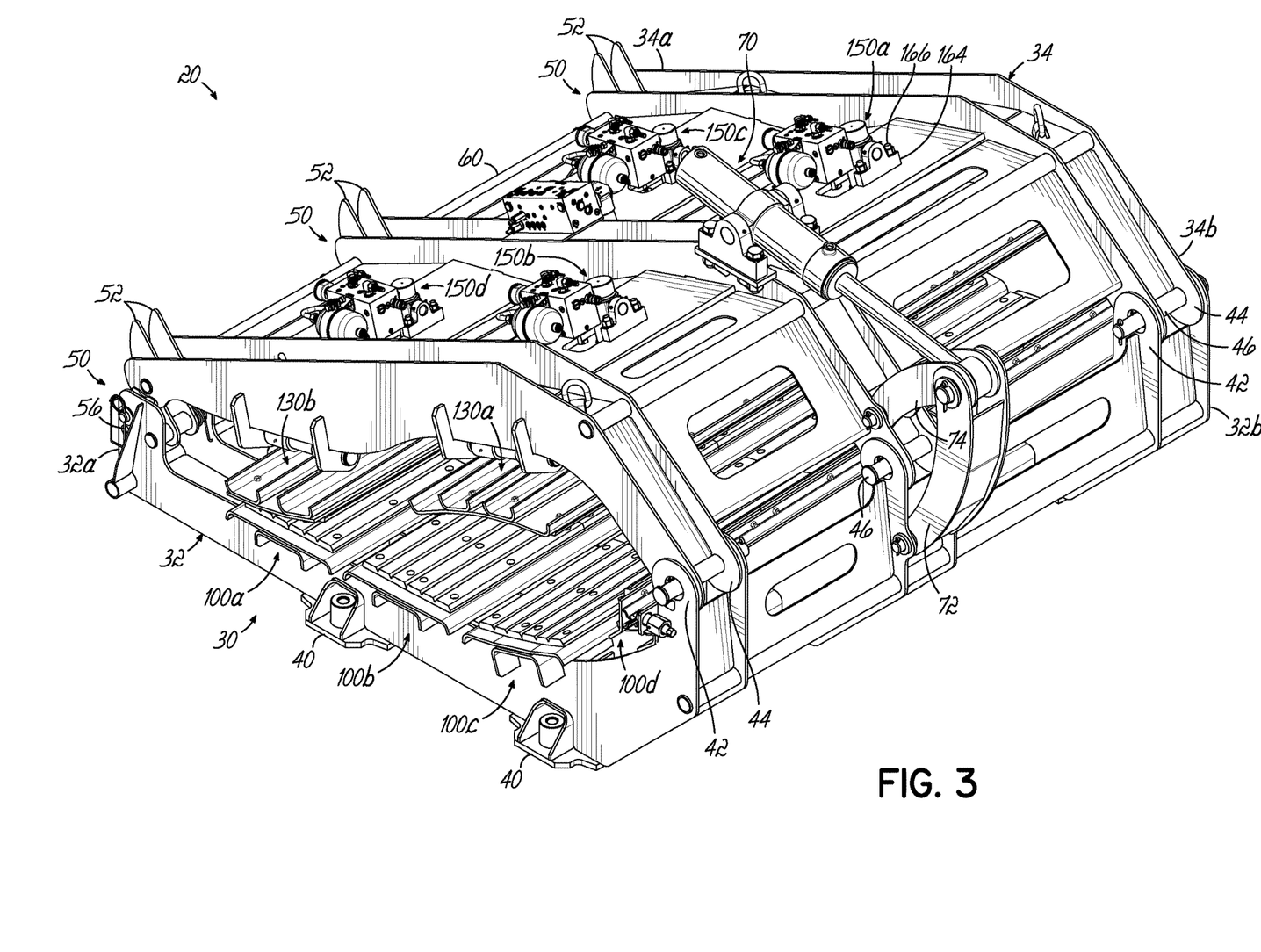
FIG. 3 is a rear perspective view of the clamp shown in FIG. 1.

With reference to FIG. 1, an exemplary transportation arrangement 10 includes a tractor or truck 12, a trailer or dolly 14, and a wind turbine blade 16 operatively coupled to the truck 12 in a known manner, such as via a root frame 18, and operatively coupled to the dolly 14 via an exemplary clamp 20. In the embodiment shown, the dolly 14 is configured to be towed from the truck 12 by the blade 16 itself such that no additional towing cable or boom is required between the truck 12 and the dolly 14. More particularly, the blade 16 and the clamp 20 may collectively define a load path between the truck 12 and the dolly 14 for allowing the truck 12 to tow the dolly 14 with acceleration and braking action of the truck 12 being transmittable to the dolly 14 via the blade 16 and the clamp 20. As described in greater detail below, the clamp 20 is configured to automatically adjust the clamping force applied on the blade 16 by the clamp 20 in response to the applied clamping force falling short of and/or exceeding certain predetermined threshold value(s) to maintain a sufficiently firm and substantially continuous clamping action on the blade 16 to restrain the blade 16 during transportation, and/or to prevent excessive, possibly damaging force from being applied to the blade 16.

While not shown in detail, the blade 16 may be of any suitable configuration and may include, for example, a leading edge, a trailing edge, a pressure side, a suction side, a root end region, and a tip end region. In the embodiment shown, the root end region of the blade 16 is operatively coupled to the truck 12 via the root frame 18 and the tip end region is operatively coupled to the dolly 14 via the clamp 20.

Referring now primarily to FIGS. 2-7, the illustrated clamp 20 includes a frame 30 having a lower portion 32 configured to be coupled to the dolly 14 and an upper portion 34 configured to be selectively rotatable relative to the lower portion 32, such that at least a region of the blade 16 (e.g., the tip end region) may be selectively positioned between the lower and upper portions 32, 34 of the frame 30. The illustrated lower and upper portions 32, 34 each extend between first ends 32a, 34a and second ends 32b, 34b, respectively, and are generally sized and shaped to collectively wrap around the exterior surface of the blade 16. For example, the lower portion 32 may be generally contoured to receive the pressure side of the blade 16 and the upper portion 34 may be generally contoured to receive the suction side of the blade 16 when the trailing edge of the blade 16 is positioned proximate the first ends 32a, 34a of the lower and upper portions 32, 34 and the leading edge of the blade 16 is positioned proximate the second ends 32b, 34b of the lower and upper portions 32, 34. In this regard, the space between the lower and upper portions 32, 34 may be relatively large proximate the second ends 32b, 34b to accommodate the relatively bulky leading edge of the blade 16, and may be relatively small proximate the first ends 32a, 34a to accommodate the relatively narrow trailing edge of the blade 16.

The illustrated lower portion 32 of the frame 30 includes a plurality of mounting brackets 40 for receiving respective fasteners (not shown) for fixedly securing the lower portion 32 of the frame 30 to the dolly 14 or to a bolster or table supported by the dolly 14. While the illustrated lower portion 32 is fixed against movement relative to the dolly 14, the lower portion 32 may alternatively be configured to selectively pivot, swivel, and/or tilt relative to the dolly 14, and/or may be adjustable in height relative to the dolly 14. For example, the lower portion 32 may be supported on a hinged bolster for pivoting the clamp 20 and accompanying blade 16 about a horizontal axis transverse to the dolly 14; the lower portion 32 may be supported on a swivel bolster for swiveling the clamp 20 and accompanying blade 16 about a vertical axis; the lower portion 32 may be supported on a tilting bolster for tilting the clamp 20 and accompanying blade 16 about a horizontal axis parallel to the dolly 14; and/or the lower portion 32 may be supported on a height adjustable bolster (e.g., scissor table) for increasing or decreasing the height of the clamp 20 and accompanying blade 16. Such features may be used to accommodate various types or models of blades 16 and/or to assist the transportation arrangement 10 in maneuvering with respect to curves, junctions, hills, or other potential road or roadside obstacles during transportation.

The lower portion 32 of the frame further includes a plurality of lower hinge joints 42 at or near the second end 32b thereof configured for alignment with respective upper hinge joints 44 provided on the upper portion 34 at or near the second end 34b thereof. Corresponding hinge pins 46 extend through each set of lower and upper hinge joints 42, 44 to thereby rotatably couple the lower and upper portions 32, 34 of the frame 30 together. In this manner, the upper portion 34 of the frame 30 may be selectively rotated relative to the lower portion 32 about an axis of rotation defined by the hinge pins 46 between the illustrated closed position wherein the first ends 32a, 34a of the lower and upper portions 32, 34 are proximate each other to capture the blade 16 and one or more opened positions (not shown) wherein the first ends 32a, 34a of the lower and upper portions 32, 34 are spaced apart from each other to allow insertion and/or removal of the blade 16 therebetween.

In the embodiment shown, at least one lock 50 is provided on the frame 30 at or near the first ends 32a, 34a of the lower and upper portions 32, 34 for selectively locking the upper portion 34 in the closed position against rotation relative to the lower portion 32. Each of the illustrated locks 50 includes at least one claw 52 removably coupled to the lower portion 32 at or near the first end 32a thereof. In the embodiment shown, each claw 52 is removably coupled to the lower portion 32 via corresponding tubes 54 and locking pins 56. Each claw 52 includes a hook 58 (FIG. 6) configured to frictionally engage at least one corresponding rail 60 provided on the upper portion 34 at or near the first end 34a thereof when the upper portion 34 is in the closed position, such that the interaction of the hook 58 with the corresponding rail 60 may prevent rotation of the upper portion 34 relative to the lower portion 32 toward the opened position. Each lock 50 may be partially or completely removable from the lower portion 32 to disengage the hook 58 from the rail 60 by removing one or more of the corresponding tubes 54 and locking pins 56 to allow rotation of the upper portion 34 relative to the lower portion 32 toward the opened position, such as for removal of the blade 16.

The clamp 20 may further include an open/close actuator 70, optionally in the form of a hydraulic cylinder, fixedly coupled to an upper surface of the upper portion 34 of the frame 30. Optionally, as illustrated, the actuator 70 may be operatively coupled to each of the lower and upper frame portions 32, 34 at or near the second ends thereof, preferably via lower and upper arms 72, 74, respectively. The actuator 70 may effect rotational movement of the upper frame portion 34 relative to the lower frame portion 32 about the axis of the rotation defined by the hinge pins 46. In the embodiment shown, the open/close actuator 70 may include a barrel 80 defining an interior and fixedly coupled to the upper frame portion 34. In particular, the barrel 80 may be coupled to the upper surface of the upper frame portion (34), preferably via a bracket 84 and fasteners 86. The open/close actuator 70 may further include a piston 90 configured to reciprocate within the barrel 80 and dividing the interior of the barrel into a bottom chamber 92 and a piston rod side chamber 94 (shown schematically in FIG. 8), and a piston rod 96 including a first end operatively coupled to the piston 90 within the piston rod side chamber 94. A second end of said piston rod 96 may be operatively coupled to the upper and lower frame portions 32, 34, in particular via upper and lower arms 72, 74, such that extension of the piston rod 96 away from the barrel 80 causes the upper frame portion 34 to rotate about the axis of rotation toward the closed position and retraction of the piston rod 96 into the barrel 80 causes the upper frame portion 34 to rotate about the axis of rotation toward the opened position. While the illustrated open/close actuator 70 is of a hydraulic configuration, any suitable open/close actuator may be used to effect rotational movement of the upper portion 34 relative to the lower portion 32 about the axis of rotation. Alternatively, the open/close actuator 70 may be eliminated such that the rotational movement of the upper frame portion 34 relative to the lower frame portion 32 about the axis of rotation may be performed manually, for example.

As shown, the clamp 20 includes at least one saddle 100 (see 100a, 100b, 100c, 100d) positioned on the lower portion 32 of the frame 30 on an interior side thereof. The illustrated clamp 20 includes first, second, and third saddles 100a, 100b, 100c positioned along the length of the lower portion 32 and configured to confront the pressure side of the blade 16, and a fourth saddle 100d positioned at or near the second end 32b of the lower portion 32 and configured to confront the leading edge of the blade 16.

Figure 4:
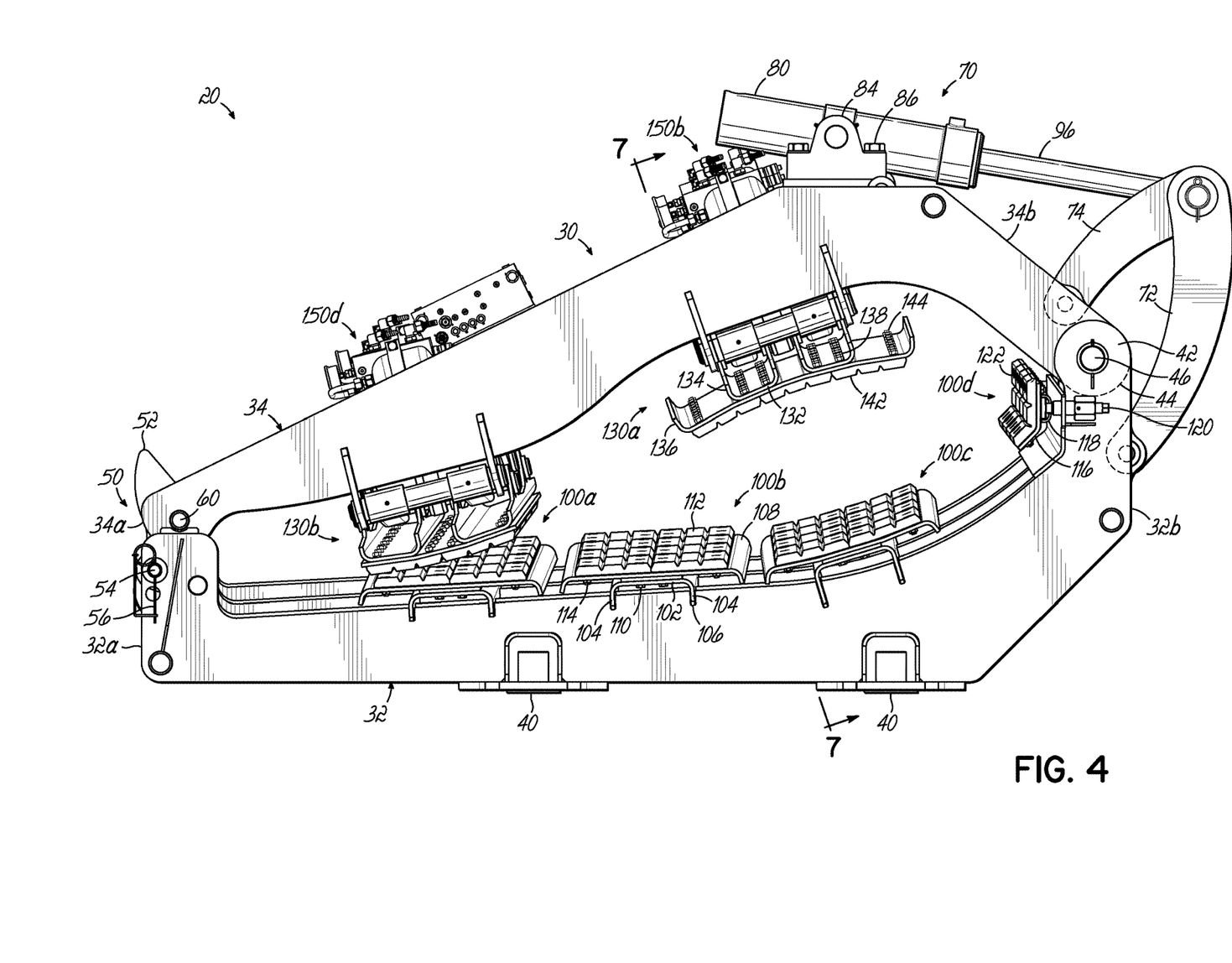
FIG. 4 is a side elevation view of the clamp shown in FIG. 1.
Figure 5:
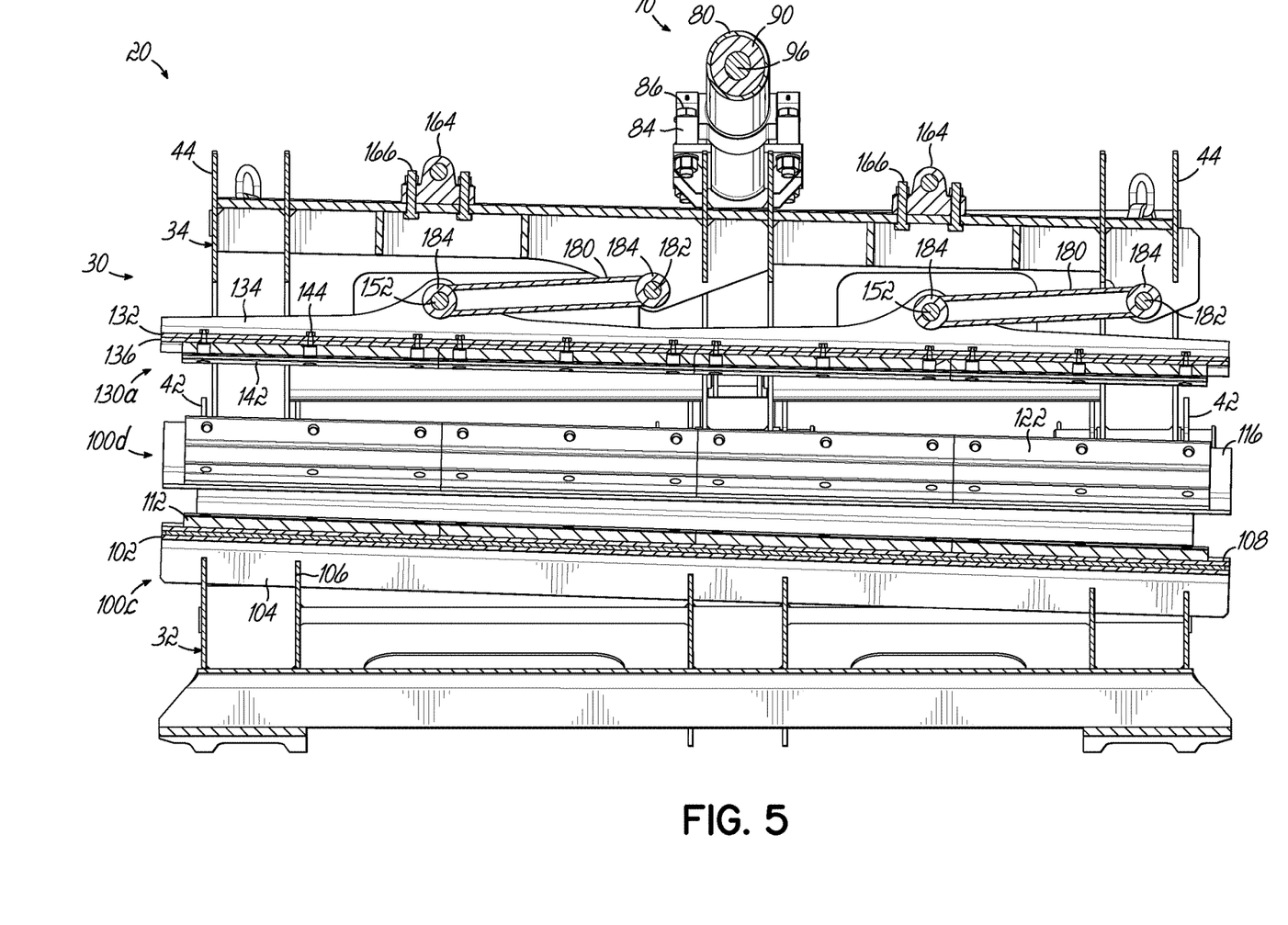
FIG. 5 is a longitudinal cross sectional view of the clamp shown in FIG. 1.

As best shown in FIG. 4, the first, second, and third saddles 100a, 100b, 100c each include a generally U-shaped support 102 having a pair of flanges 104 configured to be received by corresponding slots 106 provided in the lower portion 32, a platform 108 fixedly coupled to the support 102 via one or more fasteners 110, and at least one friction pad 112 fixedly coupled to the platform 108 via one or more fasteners 114. The fourth saddle 100d includes a generally V-shaped support 116 having a longitudinal channel 118 therealong for receiving an adjustable fastener 120 for coupling the fourth saddle 100d to the lower portion 32, and at least one friction pad 122 carried by the support 116. In the embodiment shown, the friction pads 112 of the first, second, and third saddles 100a, 100b, 100c are each configured to frictionally engage the pressure side of the blade 16, and the friction pad 122 of the fourth saddle 100d is configured to frictionally engage the leading edge of the blade 16. In this regard, the illustrated friction pads 112, 122 are slightly angled relative to a longitudinal axis of the clamp 20 (e.g., corresponding to the longitudinal axis of the blade 16), as best shown in FIGS. 4 and 5, to accommodate for slight tapering of the exterior surface of the blade 16 in the root-tip direction.

It should be appreciated that the adjustable fastener 120 associated with the illustrated fourth saddle 100d may allow the fourth saddle 100d to be manually extended and/or retracted into a desired engagement with the leading edge of the blade 16 prior to transporting the blade 16, and/or may allow the fourth saddle 100d to be removed entirely from the lower portion 32. Likewise, the illustrated first, second, and third saddles 100a, 100b, 100c may be removable from the lower portion 32 by disengaging the flanges 104 from the respective slots 106. While some degree of adjustability and/or removability of the saddles 100a, 100b, 100c, 100d is contemplated, such as when the clamp 20 is at rest, the saddles 100a, 100b, 100c, 100d may be passive or generally stationary relative to the lower portion 32 during normal operation of the clamp 20, such as during transportation of the blade 16 while restrained by the clamp 20.

As shown, the clamp 20 also includes at least one jaw 130 (see 130a, 130b) movably positioned on the upper portion 34 of the frame 30 on an interior side thereof. The illustrated clamp 20 includes first and second jaws 130a, 130b movably positioned along the length of the upper portion 34 and configured to confront the suction side of the blade 16. In the embodiment shown, the first jaw 130a has a relatively larger surface area as compared to the second jaw 130b and is configured to be positioned proximate the relatively bulky leading edge of the blade 16 such that the first jaw 130a may be considered the primary source of clamping force on the blade 16. Thus, the first jaw 130a may be referred to as the primary jaw and the second jaw 130b may be referred to as the secondary jaw.

As best shown in FIG. 4, the first and second jaws 130a, 130b each include a pair of generally U-shaped supports 132 each having a pair of flanges 134, the purposes of which are described below, a platform 136 fixedly coupled to the pair of supports 132 via one or more fasteners 138, and at least one friction pad 142 fixedly coupled to the platform 136 via one or more fasteners 144. In the embodiment shown, the friction pads 142 of the first and second jaws 130a, 130b are configured to frictionally engage the suction side of the blade 16 proximate the leading and trailing edges of the blade 16, respectively. In this regard, the illustrated friction pads 142 are slightly angled relative to the longitudinal axis of the clamp 20, as best shown in FIGS. 4 and 5, to accommodate for slight tapering of the exterior surface of the blade 16 in the root-tip direction.

As shown, the clamp 20 further includes at least one jaw actuator 150 (see 150a, 150b, 150c 150d) each in the form of a hydraulic cylinder configured to move the first and/or second jaws 130a, 130b relative to one or more of the saddles 100a, 100b, 100c, 100d to apply a clamping force on the blade 16 when the upper portion 34 of the frame 30 is in the closed position. The illustrated clamp 20 includes first and second primary jaw actuators 150a, 150b fixedly coupled to the upper portion 34 of the frame 30, and operatively coupled to each of the flanges 134 of the supports 132 of the primary jaw 130a via respective pins 152 (FIG. 5), for effecting generally linear movement of the primary jaw 130a relative to one or more of the saddles 100a, 100b, 100c, 100d. Likewise, the illustrated clamp 20 includes first and second secondary jaw actuators 150c, 150d fixedly coupled to the upper portion 34 of the frame 30, and operatively coupled to each of the flanges 134 of the supports 132 of the secondary jaw 130b via respective pins 152, for effecting generally linear movement of the secondary jaw 130b relative to one or more of the saddles 100a, 100b, 100c, 100d.

Figure 6:
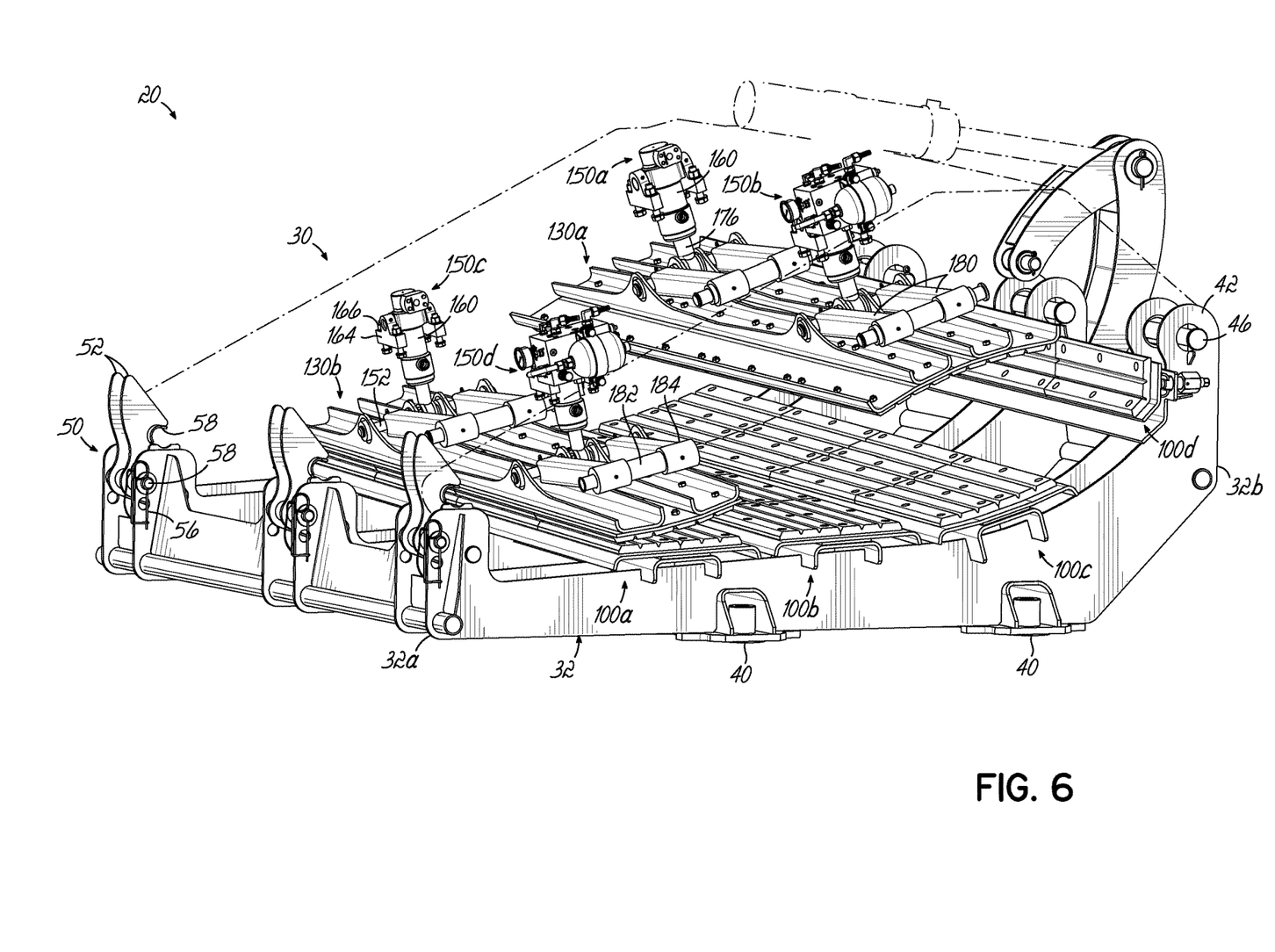
FIG. 6 is a partial front perspective view of the clamp shown in FIG. 1, with the upper portion of the frame of the clamp hidden.

As best shown in FIG. 6, each of the primary and secondary jaw actuators 150a, 150b, 150c, 150d includes a barrel 160 defining an interior and fixedly coupled to the upper surface of the upper portion 34 via a bracket 164 and fasteners 166, a piston 170 configured to reciprocate within the barrel 160 and dividing the interior of the barrel 160 into a bottom chamber 172 and a piston rod side chamber 174 (shown schematically in FIG. 8), and a piston rod 176 including a first end operatively coupled to the piston 170 within the piston rod side chamber 174 and a second end operatively coupled to the respective pin 152, such that extension of the piston rod 176 away from the barrel 160 causes the respective jaw 130a, 130b to advance generally linearly toward one or more of the saddles 100a, 100b, 100c, 100d (and the blade 16, when present) and retraction of the piston rod 176 into the barrel 160 causes the respective jaw 130a, 130b to withdraw generally linearly away from one or more of the saddles 100a, 100b, 100c, 100d (and the blade 16, when present). While the illustrated jaw actuators 150a, 150b, 150c, 150d are each of a hydraulic configuration, any suitable jaw actuators may be used to effect generally linear movement of the primary and secondary jaws 130a, 130b relative to the saddles 100a, 100b, 100c, 100d. In addition or alternatively, more or less jaw actuators than the number illustrated may be used.

In one embodiment, the interfaces between the flanges 134 and the respective pins 152 and/or between the pins 152 and the respective piston rods 176 may allow the primary and/or secondary jaws 130a, 130b to slightly rotate about one or more axes of rotation defined by one or more of the pins 152, for example, such as to accommodate for slight variances in the exterior surface of the blade 16 in the root-tip direction.

Figure 7:
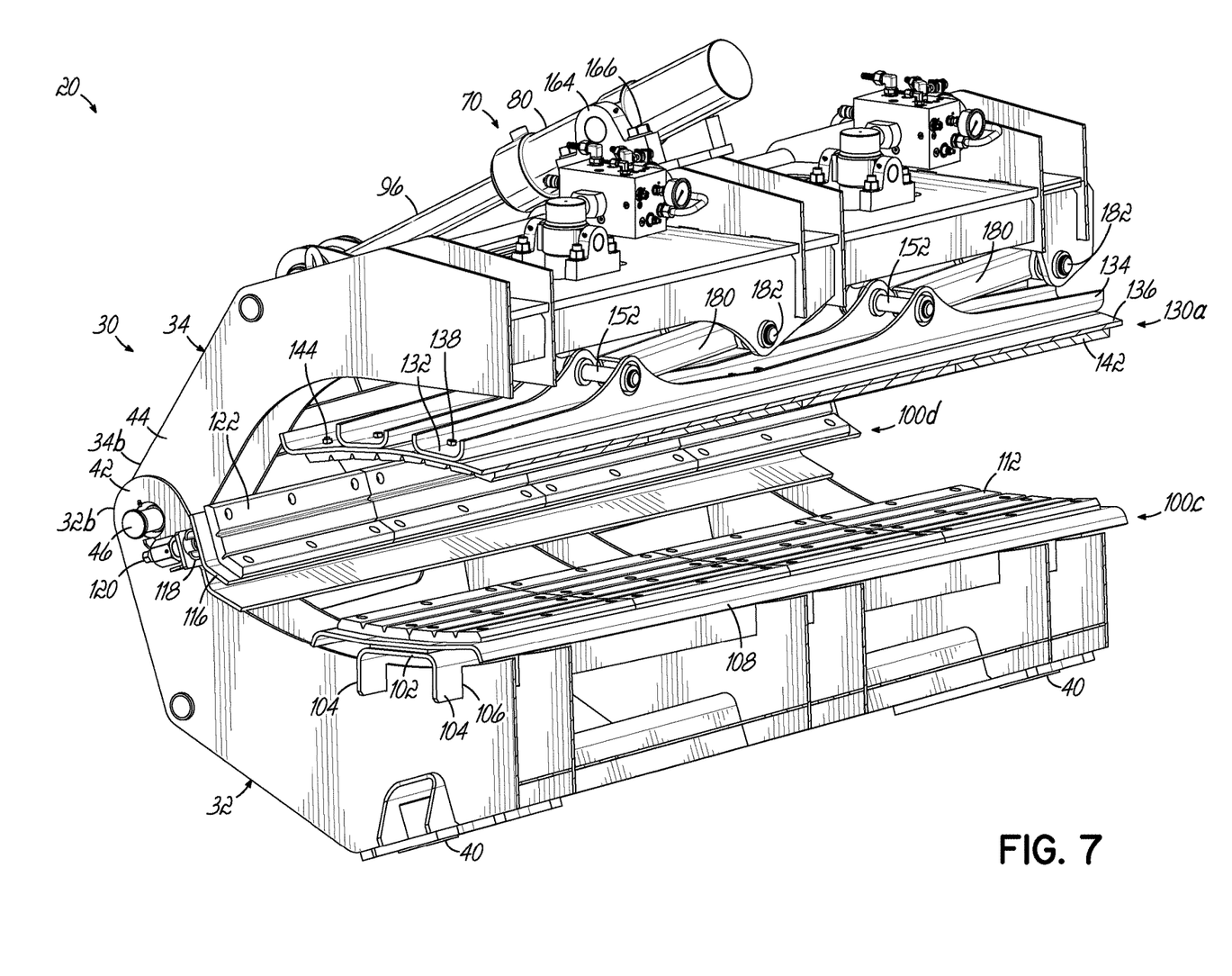
FIG. 7 is a cross sectional view of the clamp shown in FIG. 1, taken along section line 7-7 in FIG. 4.

As best shown in FIGS. 5-7, a pair of swing arms 180 extend between each of the pins 152 and a corresponding auxiliary pin 182 fixedly provided on the upper portion 34 of the frame 30. Each of the swing arms 180 may remain pivotably engaged with both the respective pin 152 and auxiliary pin 182 during linear movement of the respective jaw 130*a*, 130*b*. In this regard, each of the swing arms 180 includes a pair of recesses 184 positioned at or near the ends thereof and configured to rotatably receive the respective pin 152 and auxiliary pin 182. In one embodiment, the swing arms 180 may assist in firmly restraining the blade 16 in the clamp 20.

The illustrated clamp 20 is configured to provide "active" or "smart" clamping action on the blade 16 when the upper portion 34 is in the closed position with the blade 16 positioned between the saddles 100*a*, 100*b*, 100*c*, 100*d* and the movable jaws 130*a*, 130*b*. This may ensure improved contact between the friction pads 112, 122 and the blade 16 and thus improved retention of the blade 16 within the frame 30 of the clamp 20. The clamp 20 may thereby ensure a substantially constant clamping force on the blade 16 during transportation, even in cases where the blade's position shifts slightly between the jaw(s) 130 and the saddle(s) 100. For example, the blade 16 may be prevented from pulling itself loose in case its position in the clamp 20 were to creep slightly such that it would present a slightly narrower portion between the saddle(s) 100 and jaw(s) 130 of the clamp 20. In such a situation, the clamping action on the blade would be maintained by the effect of the energy storage device 220. The clamp 20 may be configured to continuously apply a clamping force on the blade 16 during transportation of the blade 16, and to automatically adjust the clamping action on the blade 16 in response to various events affecting the clamping force in real time without requiring manual intervention from an operator or other personnel.

In this regard, each of the jaw actuators 150*a*, 150*b*, 150*c*, 150*d* may be configured to advance the respective jaw 130*a*, 130*b* toward one or more of the saddles 100*a*, 100*b*, 100*c*, 100*d* in response to the clamping force applied on the blade 16 being less than or equal to a predetermined minimum threshold value. In this manner, the jaws 130*a*, 130*b* may be actively urged toward the blade 16 by the jaw actuators 150*a*, 150*b*, 150*c*, 150*d* to apply a substantially continuous clamping force thereto. As described in greater detail below, the applied clamping force may be regulated according to the required degree of clamping necessary to maintain the blade 16 securely in the clamp 20. For example, the predetermined minimum threshold clamping force may be selected for the particular type or model of the blade 16. Thus, the jaw actuators 150*a*, 150*b*, 150*c*, 150*d* may ensure that a minimum desired clamping force is maintained on the blade 16, thereby ensuring that the blade 16 is continuously positively restrained in the frame 30 of the clamp 20.

In addition or alternatively, each of the jaw actuators 150*a*, 150*b*, 150*c*, 150*d* may be configured to withdraw the respective jaw 130*a*, 130*b* away from the one or more of the saddles 100*a*, 100*b*, 100*c*, 100*d* in response to the clamping force being greater than or equal to a predetermined maximum threshold value. Similar to the predetermined minimum threshold clamping force, the predetermined maximum threshold clamping force may be selected for the particular type or model of the blade 16. Thus, the jaw actuators 150*a*, 150*b*, 150*c*, 150*d* may ensure that a maximum allowed clamping force on the blade 16 is not exceeded, thereby ensuring that the blade 16 is not inadvertently damaged by excessive clamping.

Figure 8:
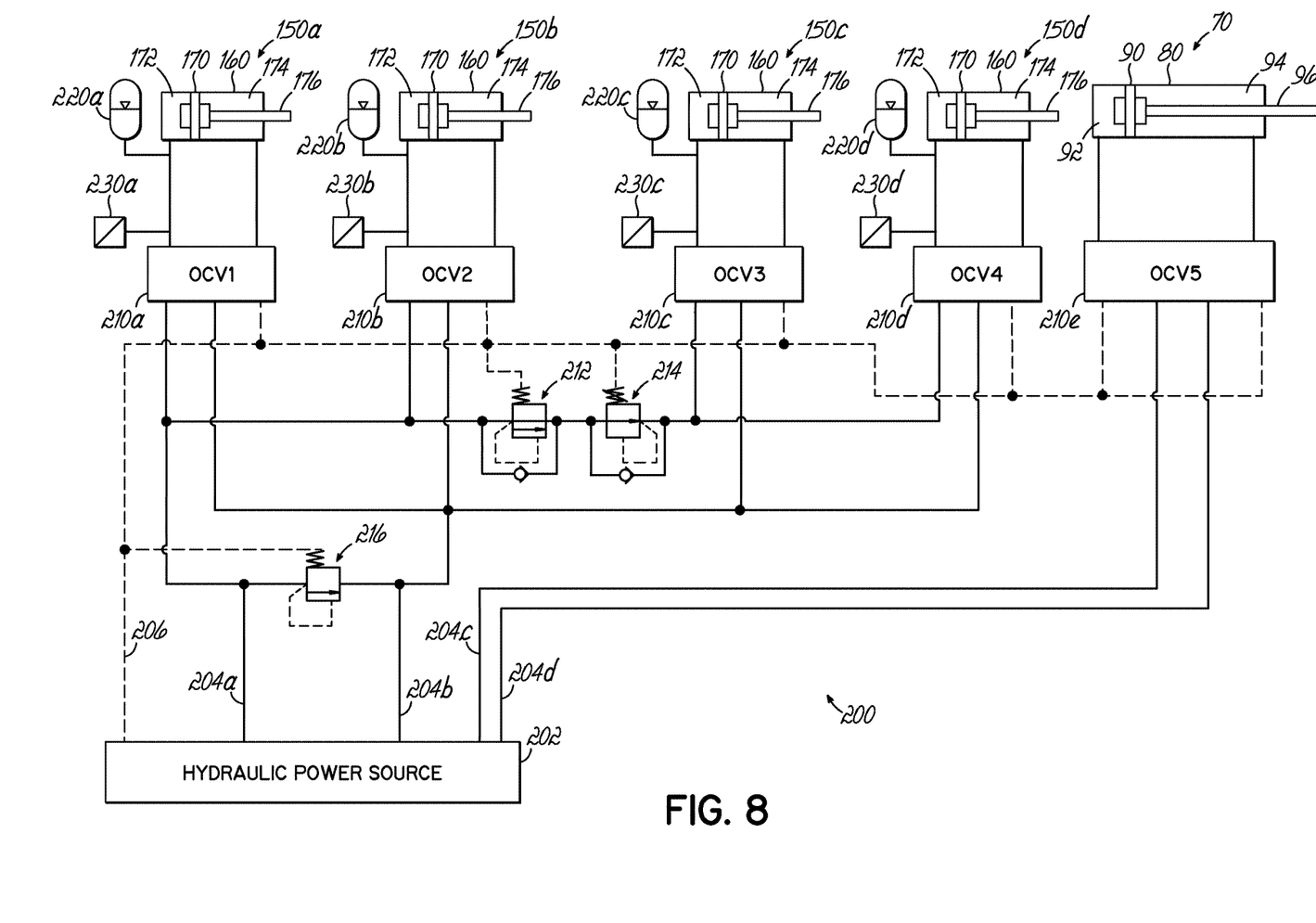
FIG. 8 is a schematic view of a hydraulic circuit for operating the open/close actuator and the jaw actuators of the clamp shown in FIG. 1.

Referring now to FIG. 8, the active or smart clamping of the blade 16 may be achieved via an exemplary hydraulic circuit 200. As shown, the hydraulic circuit 200 includes each of the aforementioned jaw actuators 150*a*, 150*b*, 150*c*, 150*d* and the open/close actuator 70. The illustrated hydraulic circuit 200 also includes a hydraulic power source 202 which may include a hydraulic fluid reservoir and a hydraulic pump (not shown), for example, for supplying hydraulic fluid such as oil to the various components of the circuit 200. In one embodiment, a hydraulic fluid reservoir and/or hydraulic pump of the dolly 14, such as of a dedicated braking system of the dolly 14, may be used for the hydraulic power source 202. In another embodiment, the hydraulic power source 202 may be provided on the truck 12. In any event, the hydraulic power source 202 is selectively fluidly coupled to each of the jaw actuators 150*a*, 150*b*, 150*c*, 150*d* and to the open/close actuator 70 via at least one working fluid line 204*a*, 204*b*, 204*c*, 204*d* (indicated as solid lines), at least one drain line 206 (indicated as dashed lines), and various other hydraulic components.

In this regard, the hydraulic power source 202 is selectively fluidly coupled to the first and second primary jaw actuators 150*a*, 150*b* and to the first and second secondary jaw actuators 150*c*, 150*d* via at least first and second working fluid lines 204*a*, 204*b*, the at least one drain line 206, and corresponding first, second, third, and fourth counter balance or over center valves 210*a*, 210*b*, 210*c*, 210*d* configured to regulate flow of hydraulic fluid into and out of the respective jaw actuators 150*a*, 150*b*, 150*c*, 150*d*. A solenoid valve (not shown) may be selectively activated to direct hydraulic fluid into the first and/or second working fluid lines 204*a*, 204*b* from the hydraulic power source 202. For example, the solenoid valve may be activated to a first position for selectively directing hydraulic fluid into the first working fluid line 204*a* and subsequently into the bottom chamber 172 of the barrel 160 of each of the primary jaw actuators 150*a*, 150*b* to move the primary jaw 130*a* toward the one or more saddles 100*a*, 100*b*, 100*c*, 100*d*, such as for exerting a suitable clamping force on the blade 16 proximate the leading edge. In this regard, the primary jaw actuators 150*a*, 150*b* are arranged in parallel with each other such that they may be pressurized substantially simultaneously with each other.

In the embodiment shown, the first working fluid line 204*a* is generally bifurcated into a first section including the primary jaw actuators 150*a*, 150*b* and a second section including the secondary jaw actuators 150*c*, 150*d* by a sequence valve 212 and a pressure relief valve 214 for ensuring that the first section is pressurized to a desired pressure before the second section is pressurized. In this manner, a suitable clamping force may be applied to the blade 16 proximate the leading edge first, and may be applied to the blade 16 proximate the trailing edge second. For example, the sequence valve 212 may have a predetermined fluid pressure threshold of 150 bar and the pressure relief valve 214 may have a predetermined fluid pressure threshold of 80 bar. Thus, with the solenoid valve in the first position and after the primary jaw 130*a* has moved toward the one or more saddles 100*a*, 100*b*, 100*c*, 100*d* to provide a clamping force on the blade 16, the hydraulic fluid may be directed through the sequence valve 212 and pressure relief valve 214 into the second section of the first working fluid line 204*a* and subsequently into the bottom chamber 172 of the barrel 160 of each of the secondary jaw actuators 150*c*, 150*d* to move the secondary jaw 130*b* toward the one or more saddles 100*a*, 100*b*, 100*c*, 100*d*, such as for exerting a suitable clamping force on the blade 16 proximate the trailing edge. In this regard, the secondary jaw actuators 150c, 150d are arranged in parallel with each other such that they may be pressurized substantially simultaneously with each other.

Alternatively, the solenoid valve may be activated to a second position for selectively directing hydraulic fluid into the second working fluid line 204b and subsequently into the piston rod side chamber 174 of the barrel 160 of each of the primary and secondary jaw actuators 150a, 150b, 150c, 150d to move both the primary and secondary jaws 130a, 130b away from the one or more saddles 100a, 100b, 100c, 100d, such as for releasing the blade 16.

In the embodiment shown, a pressure relief valve 216 is positioned between the first and second working fluid lines 204a, 204b for diverting hydraulic fluid from the first working fluid line 204a to the second working fluid line 204b if the fluid pressure within the first working fluid line 204a exceeds a predetermined threshold, such as 160 bar, for example.

As shown, the hydraulic power source 202 is also selectively fluidly coupled to the open/close actuator 70 via third and fourth working fluid lines 204c, 204d, the at least one drain line 206, and a fifth counter balance or over center valve 210e configured to regulate flow of hydraulic fluid into and out of the open/close actuator 70. A solenoid valve (not shown) may be selectively activated to direct hydraulic fluid into the third and/or fourth working fluid lines 204c, 204d from the hydraulic power source 202. For example, the solenoid valve may be activated to a first position for selectively directing hydraulic fluid into the third working fluid line 204c and subsequently into the bottom chamber 92 of the barrel 80 of the open/close actuator 70 to move the upper portion 34 of the frame 30 toward the opened position, such as for insertion or removal of the blade 16. Alternatively, the solenoid valve may be activated to a second position for selectively directing hydraulic fluid into the fourth working fluid line 204d and subsequently into the piston rod side chamber 94 of the barrel 80 of the open/close actuator 70 to move the upper portion 34 of the frame 30 toward the closed position, such as for capturing the blade 16.

In the embodiment shown, each of the jaw actuators 150a, 150b, 150c, 150d is equipped with a dedicated energy storage device in the form of a hydraulic accumulator 220a, 220b, 220c, 220d fluidly coupled to the bottom chamber 172 of the respective jaw actuator 150a, 150b, 150c, 150d and configured to selectively store and release energy from and to the respective jaw actuator 150a, 150b, 150c, 150d, thereby providing some flexibility and/or yield to each of the jaw actuators 150a, 150b, 150c, 150d for responding to unexpected increases and/or decreases in fluid pressure within the bottom chambers 172, as described in greater detail below.

Each hydraulic accumulator 220a, 220b, 220c, 220d may be configured as a compressed gas or gas-charged closed accumulator, for example, and may include a hydraulic fluid chamber and a pressurized inert gas (e.g., nitrogen) chamber for providing a compressive force on the hydraulic fluid via an elastic diaphragm, enclosed bladder, or floating piston. The hydraulic fluid chamber of each hydraulic accumulator 220a, 220b, 220c, 220d may be configured to receive hydraulic fluid from the hydraulic power source 202 when the respective section of the first working fluid line 204a is pressurized, thereby decreasing the volume of the compressed gas and increasing the pressure of the gas and the pressure on the hydraulic fluid. In one embodiment, each hydraulic accumulator 220a, 220b, 220c, 220d may be configured to be pressurized to 160 bar. In addition or alternatively, each hydraulic accumulator 220a, 220b, 220c, 220d may have a volume greater than that of the respective jaw actuator 150a, 150b, 150c, 150d.

Each hydraulic accumulator 220a, 220b, 220c, 220d may be configured to supply hydraulic fluid to the bottom chamber 172 of the respective jaw actuator 150a, 150b, 150c, 150d in response to a fluid pressure within the bottom chamber 172 falling short of a first predetermined minimum threshold value corresponding to the predetermined minimum threshold clamping force, so that the resulting pressurization of the bottom chamber 172 may cause the respective jaw 130a, 130b to advance toward the one or more saddles 100a, 100b, 100c, 100d and thereby increase the clamping force applied to the blade 16. In this manner, the hydraulic circuit 200 may automatically compensate for undesirable decreases in pressure within the bottom chambers 172 of the jaw actuators 150a, 150b, 150c, 150d which may be indicative of the blade 16 creeping, drifting, or otherwise beginning to slip, and/or of minor hydraulic fluid leakage from the hydraulic circuit 200. Thus, the hydraulic accumulators 220a, 220b, 220c, 220d may assist in maintaining a substantially continuous desired clamping force on the blade 16.

In addition or alternatively, each hydraulic accumulator 220a, 220b, 220c, 220d may be configured to receive hydraulic fluid from the bottom chamber 172 of the respective jaw actuator 150a, 150b, 150c, 150d in response to a fluid pressure within the bottom chamber 172 exceeding a predetermined maximum threshold value corresponding to the predetermined maximum threshold clamping force, so that the resulting depressurization of the bottom chamber 172 may cause the respective jaw 130a, 130b to withdraw away from the one or more saddles 100-d and thereby decrease the clamping force applied to the blade 16. In this manner, the hydraulic circuit 200 may automatically compensate for undesirable increases in pressure within the bottom chambers 172 of the jaw actuators 150a, 150b, 150c, 150d which may be indicative of excessive, potentially damaging force application on the blade 16. Thus, the hydraulic accumulators 220a, 220b, 220c, 220d may assist in preventing damage to the blade 16.

While the energy storage devices of this embodiment are illustrated as hydraulic accumulators 220a, 220b, 220c, 220d, any other suitable energy storage devices, such as one or more springs, may be used to selectively store and release energy from and to the respective jaw actuator 150a, 150b, 150c, 150d in response to the applied clamping force exceeding or falling short of the predetermined maximum or minimum threshold values.

In the embodiment shown, one or more or a plurality of pressure sensors 230 (see 230a, 230b, 230c, 230d) may be configured to detect a fluid pressure within the bottom chamber 172 of each of the jaw actuators 150a, 150b, 150c, 150d. For example, each pressure sensor 230a, 230b, 230c, 230d may be positioned in-line with the first working fluid line 204a at or near the bottom chamber 172 and/or at or near the hydraulic fluid chamber of the respective accumulator 220a, 220b, 220c, 220d. Each pressure sensor 230a, 230b, 230c, 230d may be in operative communication with a display (not shown) and may be configured to communicate an alert to the display in response to the detected fluid pressure falling short of a second predetermined minimum threshold value. The second predetermined minimum threshold value may be less than the first predetermined minimum threshold value, and may be indicative of the clamping force being too low to provide adequate retention of the blade 16 as a result of major hydraulic fluid leakage from the hydraulic circuit 200 and/or of severe slippage of the blade 16 from the clamp 20. Such an event may require the attention of the operator to remedy, such as by halting transportation and re-establishing the desired pressurization of the jaw actuators 150*a*, 150*b*, 150*c*, 150*d*. Thus, the second predetermined minimum threshold value may be considered an absolute predetermined minimum threshold value. For example, the second predetermined minimum threshold value may be 140 bar.

In one embodiment, one or more of the aforementioned solenoid valves and/or pressure sensors 230*a*, 230*b*, 230*c*, 230*d* may receive electrical power from an electrical power supply of the truck 12 via one or more electrical cables (not shown) for routing the electrical power from the electrical power supply to the dolly 14, for example.

In order to transport the blade 16, the root end region of the blade 16 may be operatively coupled to the truck 12 in a known manner and the clamp 20 may be secured to the dolly 14. The upper portion 34 of the frame 30 of the clamp 20 may initially be in the opened position so that the tip end region of the blade 16 may be inserted between the first ends 32*a*, 34*a* of the frame 30 and placed on or against the saddles 100*a*, 100*b*, 100*c*, 100*d* of the lower portion 32 of the frame 30. The upper portion 34 may subsequently be rotated relative to the lower portion 32 about the axis of rotation to the closed position, such as via the open/close actuator 70, and may be selectively locked against further movement relative to the lower portion 32 via the lock 50. With the upper portion 34 in the closed position, the first section of the first working fluid line 204*a* may be pressurized to a predetermined pressure to advance the primary jaw 130*a* into frictional engagement with the blade 16 to provide a predetermined clamping force on the blade 16 corresponding to the predetermined pressure, and to pressurize the hydraulic fluid chambers of the respective accumulators 220*a*, 220*b*. The second section of the first working fluid line 204*a* may be subsequently pressurized to a predetermined pressure to advance the secondary jaw 130*b* into frictional engagement with the blade 16 to also provide a predetermined clamping force on the blade 16 corresponding to the predetermined pressure, and to pressurize the hydraulic fluid chambers of the respective accumulators 220*c*, 220*d*. The predetermined clamping force may be selected to be sufficiently high to prevent slippage or disengagement of the blade 16 from the clamp 20 and to be sufficiently low to prevent damage to the blade 16.

With the blade 16 operatively coupled to the truck 12 and to the dolly 14 via the clamp 20, the truck 12 may be driven to tow the dolly 14 with the blade 16 and the clamp 20 defining the load path between the truck 12 and the dolly 14 such that acceleration and braking action of the truck 12 are transmitted to the dolly 14 via the blade 16 and the clamp 20. The clamp 20 substantially continuously maintains the predetermined clamping force during transportation via the active or smart clamping feature described above. For example, if the blade 16 creeps or drifts forward through the frame 30 such that a relatively slender region of the blade 16 enters the space between the saddles 100*a*, 100*b*, 100*c*, 100*d* and the jaws 130*a*, 130*b* due to strain, small shocks during transportation, or hydraulic fluid leakage, the accumulator(s) 220*a*, 220*b*, 220*c*, 220*d* may supply hydraulic fluid to the respective jaw actuator(s) 150*a*, 150*b*, 150*c*, 150*d* such that the jaws 130*a*, 130*b* may automatically follow forward to maintain the predetermined clamping force on the blade 16 and thereby continue to adequately restrain the blade 16 in the clamp 20. Likewise, if the jaws 130*a*, 130*b* begin to exert an excessive clamping force on the blade 16, the accumulator(s) 220*a*, 220*b*, 220*c*, 220*d* may receive hydraulic fluid from the respective jaw actuator(s) 150*a*, 150*b*, 150*c*, 150*d* such that the jaws 130*a*, 130*b* may automatically fall backward to maintain the predetermined clamping force on the blade 16 and thereby continue to avoid damaging the blade 16.

In the event of a major decrease in hydraulic pressure, the operator may be alerted by the pressure sensors 230*a*, 230*b*, 230*c*, 230*d* and may halt the truck 12 and re-establish the desired hydraulic pressure in the hydraulic circuit 200. In one embodiment, the transportation arrangement 10 may be capable of experiencing between 12 and 16 hours of travel time before requiring re-establishment of the desired hydraulic pressure. Optionally, an alert triggered by a detected loss of clamping force between the clamp 20 and the blade 16 may trigger an alarm instructing a driver to immediately bring the transport truck 12 to a halt.

After the transportation arrangement 10 has arrived at the desired destination, the upper portion 34 of the frame 30 may be unlocked and rotated to the opened position and the blade 16 may be removed from the clamp 20 for mounting, maintenance, or any other desired purpose.

Figure 9:
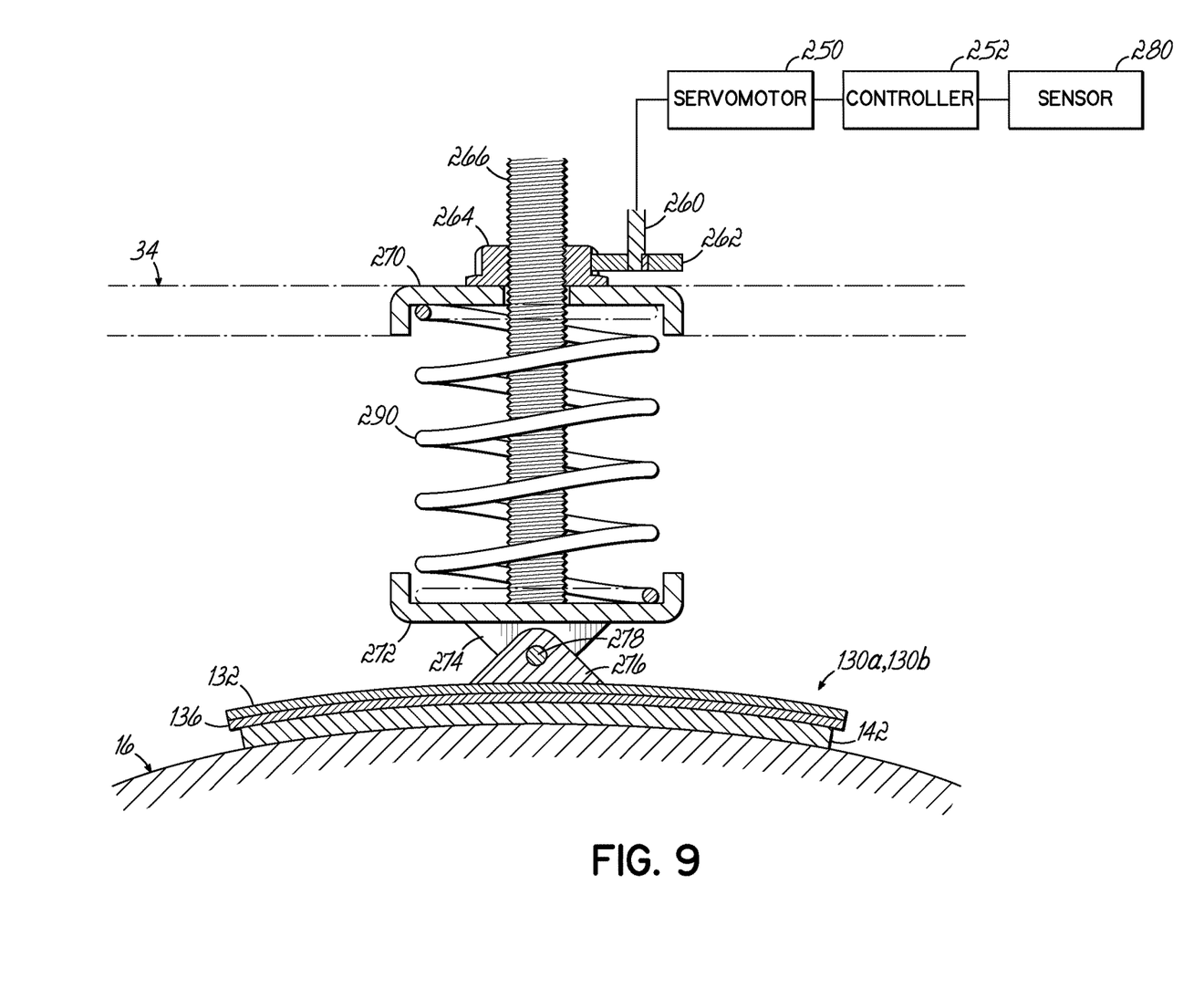
FIG. 9 is a cross sectional view of an alternative jaw actuator.

Referring now to FIG. 9, an alternative jaw actuator in the form of an electric servomotor 250 in operative communication with a controller 252 may be configured to move one or more of the jaws 130*a*, 130*b* relative to the saddles 100*a*, 100*b*, 100*c*, 100*d* to apply a clamping force on the blade 16 when the upper portion 34 of the frame 30 is in the closed position. The illustrated servomotor 250 is operatively coupled to the support 132 of the respective jaw 130*a*, 130*b* for effecting generally linear movement of the jaw 130*a*, 130*b* relative to one or more of the saddles 100*a*, 100*b*, 100*c*, 100*d*. In this regard, a rotatable shaft 260 extends from the servomotor 250 and terminates at a pinion 262 configured to frictionally engage a lead nut 264 which is, in turn, threadably engaged with a lead screw 266 such that rotation of the lead nut 264 via activation of the servomotor 250 may cause the lead screw 266 to move linearly. The illustrated lead screw 266 extends through a top plate 270 fixedly coupled to the upper portion 34 of the frame 30 of the clamp 20 toward a bottom plate 272 operatively coupled to the support 132 of the respective jaw 130*a*, 130*b* such that extension of the lead screw 266 away from the lead nut 264 causes the respective jaw 130*a*, 130*b* to advance generally linearly toward one or more of the saddles 100*a*, 100*b*, 100*c*, 100*d* (and the blade 16, when present) and retraction of the lead screw 266 into the lead nut 264 causes the respective jaw 130*a*, 130*b* to withdraw generally linearly away from one or more of the saddles 100*a*, 100*b*, 100*c*, 100*d* (and the blade 16, when present).

In the embodiment shown, the bottom plate 272 is pivotably coupled to the jaw 130*a*, 130*b* via first and second hinge leaves 274, 276 and a hinge pin 278 which may allow the jaw 130*a*, 130*b* to slightly rotate about an axis of rotation defined the hinge pin 278, for example, such as to accommodate for slight variances in the exterior surface of the blade 16.

Similar to the above embodiment, the servomotor 250 may be configured to advance the jaw 130*a*, 130*b* toward one or more of the saddles 100*a*, 100*b*, 100*c*, 100*d* in response to the clamping force applied on the blade 16 being less than or equal to a predetermined minimum threshold value, and/or may be configured to withdraw the jaw 130*a*, 130*b* away from the one or more of the saddles 100*a*, 100*b*, 100*c*, 100*d* in response to the clamping force being greater than or equal to a predetermined maximum threshold value. In this embodiment, the active or smart clamping of the blade 16 may be achieved via one or more sensors 280 in operative communication with the controller 252 and configured to provide feedback to the controller 252 indicative of the clamping force being applied to the blade 16 by the jaw 130a, 130b. If the sensed clamping force is too low, the controller 252 may activate the servomotor 250 to increase the clamping force. Likewise, if the sensed clamping force is too high, the controller 252 may activate the servomotor 250 to decrease the clamping force. In one embodiment, the sensor 280 may be a compression sensor positioned directly on the jaw 130a, 130b, such as on or in the friction pad(s) 142 thereof.

In addition or alternatively, the sensor 280 may be configured to measure the compressive force and/or extension of a compression spring 290 extending around the lead screw 266 between the top and bottom plates 270, 272. The spring 290 may be permitted to expand as the lead screw 266 and bottom plate 272 advance from the lead nut 264 and may be compressed as the lead screw 266 and bottom plate 272 retract toward the lead nut 264. Thus, the compressive force of the spring 290 and/or the extension of the spring 290 may be indicative of the clamping force applied to the blade 16. Variations in the compressive force and/or extension of the spring 290 detected by the sensor 280 and communicated to the controller 252 may be compensated for by activation of the servomotor 250 to substantially continuously maintain the desired clamping force on the blade 16 similar to the above embodiment. The controller 252 may also be configured to communicate an alert to the display in response to the detected compressive force and/or extension of the spring 290 falling short of an absolute predetermined minimum threshold value, which may be indicative of the clamping force being too low to provide adequate retention of the blade 16 as a result of severe slippage of the blade 16 from the clamp 20, for example. Such an event may require the attention of the operator to remedy, such as by halting transportation and servicing, re-setting, or adjusting the servomotor 250 and/or associated components.

Thus, the transportation arrangement 10 may reliably maintain a desired clamping force on the blade 16 during transportation while towing the dolly 14 from the truck 12 via the blade 16 and the clamp 20 by actively responding to and compensating for undesirable decreases and/or increases in the applied clamping force during such transportation to prevent the blade 16 from slipping out from the clamp 20 and to prevent compressive damage to the blade 16. By continuously monitoring the clamping action on the blade 16 during transportation of the blade 16 and automatically adjusting the clamping action on the blade 16 in response to such events in real time, the need for manual intervention from the operator to ensure proper clamping of the blade 16 during transportation may be avoided or eliminated.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A transportation arrangement, comprising:
    a dolly; and
    a clamp secured to the dolly, the clamp including:
        a frame having a lower portion coupled to the dolly and an upper portion selectively rotatable relative to the lower portion;
        at least one saddle positioned on the lower portion of the frame;
        at least one jaw movably positioned on the upper portion of the frame; and
        at least one jaw actuator operatively coupled to the at least one jaw and configured to move the at least one jaw relative to the at least one saddle to apply a clamping force on a blade positioned between the at least one saddle and the at least one jaw,
    wherein the at least one jaw actuator is configured to extend the at least one jaw toward the at least one saddle in response to the clamping force being less than or equal to a predetermined minimum threshold clamping force, and
    wherein the at least one jaw actuator is configured to retract the at least one jaw away from the at least one saddle in response to the clamping force being greater than or equal to a predetermined maximum threshold clamping force.

2. The transportation arrangement of claim 1, wherein the clamp further includes at least one energy storage device configured to selectively store and release energy from and to the at least one jaw actuator.

3. The transportation arrangement of claim 2, wherein the at least one energy storage device is configured to release energy to the at least one jaw actuator in response to the clamping force being less than or equal to the predetermined minimum threshold clamping force.

4. The transportation arrangement of claim 2, wherein the at least one energy storage device is configured to store energy from the at least one jaw actuator in response to the clamping force being greater than or equal to the predetermined maximum threshold clamping force.

5. The transportation arrangement of claim 2, wherein the at least one energy storage device includes at least one hydraulic accumulator.

6. The transportation arrangement of claim 5, wherein the at least one jaw actuator includes at least one hydraulic cylinder including:
    a barrel defining an interior;
    a piston configured to reciprocate within the barrel and dividing the interior of the barrel into a bottom chamber and a piston rod side chamber; and
    a piston rod including a first end operatively coupled to the piston within the piston rod side chamber and a second end operatively coupled to the at least one jaw,
    wherein the bottom chamber is fluidly coupled to the at least one hydraulic accumulator.

7. The transportation arrangement of claim 6, wherein the at least one hydraulic accumulator is configured to supply hydraulic fluid to the bottom chamber in response to a hydraulic fluid pressure within the bottom chamber being less than or equal to a first predetermined minimum threshold pressure corresponding to the predetermined minimum threshold clamping force to extend the at least one jaw toward the at least one saddle.

8. The transportation arrangement of claim 6, wherein the at least one hydraulic accumulator is configured to receive hydraulic fluid from the bottom chamber in response to the hydraulic fluid pressure within the bottom chamber being greater than or equal to a predetermined maximum threshold pressure corresponding to the predetermined maximum threshold clamping force to retract the at least one jaw from the at least one saddle.

9. The transportation arrangement of claim 7, further comprising:
a display; and
at least one pressure sensor configured to detect a hydraulic fluid pressure within the bottom chamber, wherein the at least one pressure sensor is configured to communicate an alert to the display in response to the detected hydraulic fluid pressure being less than or equal to a second predetermined minimum threshold pressure less than the first predetermined minimum threshold pressure.

10. The transportation arrangement of claim 2, wherein the at least one energy storage device includes at least one spring.

11. The transportation arrangement of claim 1, further comprising:
a truck configured to tow the dolly; and
a blade including a first region operatively coupled to the truck and a second region positioned between the at least one saddle and the at least one jaw of the clamp such that the second region is operatively coupled to the dolly via the clamp,
wherein the blade and the clamp define a load path between the truck and the dolly for allowing the truck to tow the dolly.

12. The transportation arrangement of claim 1, wherein the at least one saddle and the at least one jaw each include at least one friction pad.

13. A transportation arrangement, comprising:
a dolly; and
a clamp secured to the dolly, the clamp including:
a frame having a lower portion coupled to the dolly and an upper portion selectively rotatable relative to the lower portion;
at least one saddle positioned on the lower portion of the frame;
at least one jaw movably positioned on the upper portion of the frame; and
at least one jaw actuator operatively coupled to the at least one jaw and configured to move the at least one jaw relative to the at least one saddle to apply a clamping force on a blade positioned between the at least one saddle and the at least one jaw,
wherein the at least one jaw actuator is configured to extend the at least one jaw toward the at least one saddle in response to the clamping force being less than or equal to a predetermined minimum threshold clamping force, and
wherein the clamp further includes an open/close actuator operatively coupled to the upper portion of the frame and configured to selectively rotate the upper portion relative to the lower portion.

14. A method of transporting a wind turbine blade, comprising:
providing a dolly and a clamp secured to the dolly;
rotating a first portion of the clamp relative to a second portion of the clamp to an opened position;
inserting a region of the blade into the clamp;
rotating the first portion of the clamp relative to the second portion of the clamp to a closed position;
moving at least one jaw into frictional engagement with the blade to apply a clamping force on the blade;
extending the at least one jaw toward the second portion of the clamp in response to the clamping force being less than or equal to a predetermined minimum threshold clamping force, and
retracting the at least one jaw away from the second portion of the clamp in response to the clamping force being greater than or equal to a predetermined maximum threshold clamping force.

15. The method of claim 14, wherein the step of extending the at least one jaw includes selectively releasing energy from at least one energy storage device to at least one jaw actuator in response to the clamping force being less than or equal to the predetermined minimum threshold clamping force.

16. The method of claim 14, wherein the step of retracting the at least one jaw includes selectively storing energy from at least one jaw actuator in at least one energy storage device in response to the clamping force being greater than or equal to the predetermined maximum threshold clamping force.

17. The method of claim 14, further comprising:
towing the dolly from a truck via the blade and the clamp such that the blade and the clamp define a load path between the truck and the dolly.

18. The method of claim 17, further comprising:
rotating the first portion of the clamp relative to the second portion of the clamp to an opened position after the step of towing the dolly from the truck via the blade and the clamp; and
removing the region of the blade from the clamp.

19. The transportation arrangement of claim 11, wherein the first region of the blade includes a root end region of the blade and wherein the second region of the blade includes a tip end region of the blade.

* * * * *